Patented Nov. 18, 1952

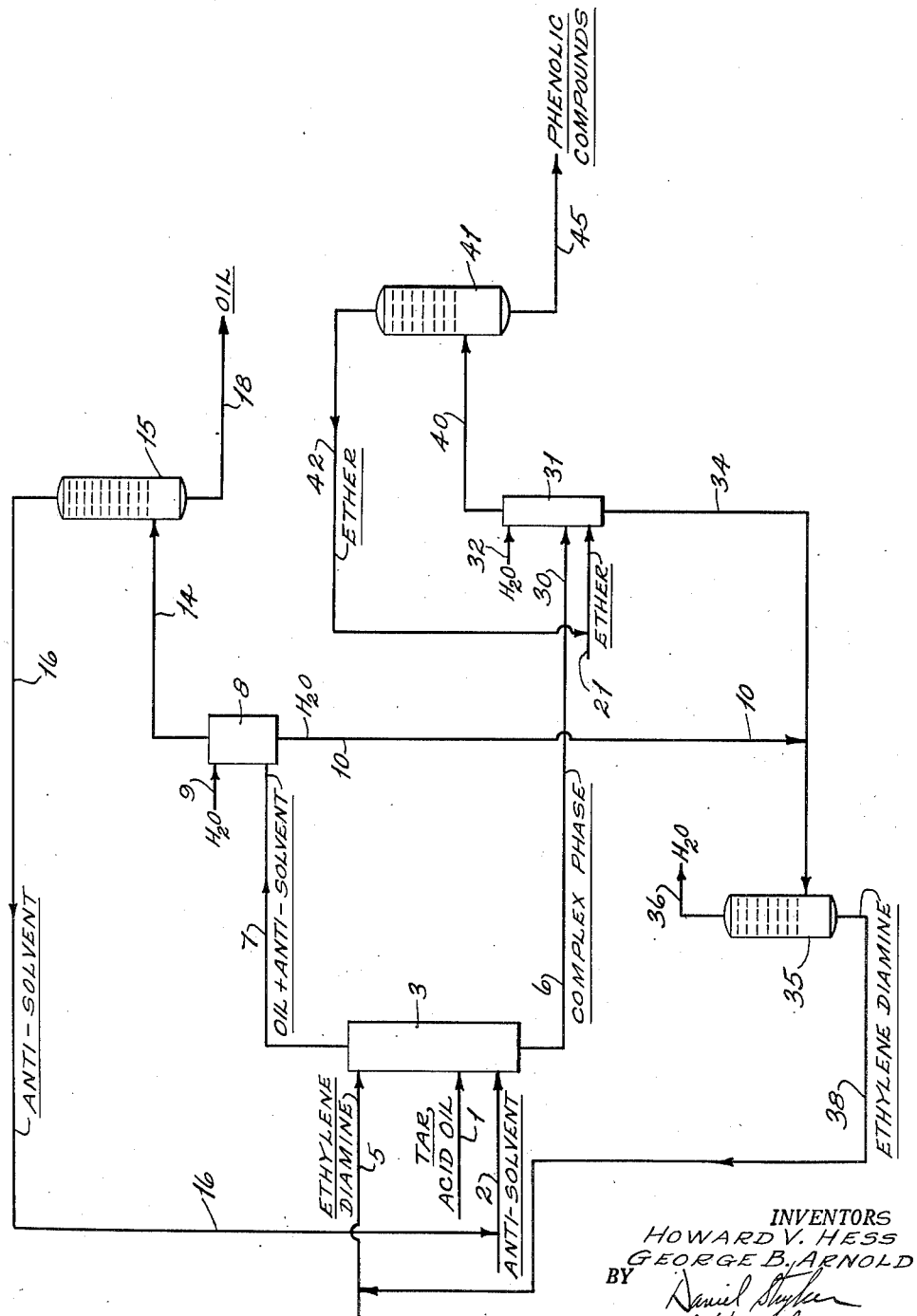

2,618,666

UNITED STATES PATENT OFFICE 2,618,666

PROCESS FOR ISOLATING PHENOLIC COMPOUNDS

Howard V. Hess, Beacon, and George B. Arnold, Glenham, N. Y., assignors to The Texas Company, New York, N. Y., a corporation of Delaware Application January 17, 1951, Serial No. 206,390

18 Claims. (Cl. 260—627)

This invention relates to a novel process for isolating phenolic compounds from mixtures thereof. It is particularly concerned with the isolation of phenol and alkylated phenols containing as many as 15 carbon atoms in one or more side chains from aromatic mixtures, such as coal tar, which are commercial sources of said compounds.

In accordance with the process of this invention, phenol and alkylated phenolic compounds containing up to 15 carbon atoms in one or more side chains are separated from crude mixtures wherein they are associated with higher phenolic compounds and non-phenolic compounds by contact with a polyamino compound which is either an alkylene diamine, a polyalkylene polyamine or a mixture thereof in the presence of an anti-solvent. Contact of the phenolic compound-containing mixture with an amino compound of the prescribed type in the presence of an anti-solvent results in the formation of complexes of the polyamino compound with phenolic compounds of the prescribed type. The resulting complexes are substantially insoluble in the anti-solvent solution of crude mixtures and are readily separated therefrom as a liquid complex phase. A paraffinic hydrocarbon or a mixture of paraffinic hydrocarbons is employed as the anti-solvent; a pentane fraction is a particularly preferred anti-solvent. Decomposition of the separated liquid complex phase is effected by contact with water, a low boiling aromatic hydrocarbon such as benzene and toluene or with a water-insoluble oxygenated hydrocarbon solvent such as ether which dissociates the complex into its components.

Decomposition of the complex with water-insoluble solvents results in formation of a two-phase system, an extract phase containing the phenolic compounds and a raffinate phase comprising mainly the polyamine complexing agent. Residual polyamino compound is removed from the extract phase by water washing. Low molecular weight phenols are readily isolated from the water-washed decomposition solvent. The raffinate phase is ordinarily recycled to contact further quantities of crude aromatic mixture.

Water may be used as the decomposition solvent when the complex contains water-insoluble phenolic compounds. Water decomposes the complex by extracting the polyamine component therefrom and there is formed a raffinate phase comprising phenolic compounds and an aqueous extract phase containing the complexing agent. The extract phase can be used as complexing agent after concentration of the polyamine therein by evaporation of water.

The polyamino compound per se or an aqueous solution thereof can be employed to contact the phenolic compound-containing crude mixture in the presence of an anti-solvent, but it is preferred to use substantially anhydrous polyamino compound in order to avoid emulsion troubles.

Contact of the liquid polyamine or the aqueous solution thereof is ordinarily effected at atmospheric temperature although temperatures as high as 250° F. may be employed. Decomposition of the separated complex is also ordinarily effected at atmospheric temperature although temperatures as high as 250° F. may also be employed in the decomposition of the separated complex.

Phenol and alkyl phenols are important chemicals of commerce and are widely used in the manufacture of resins, dyes, pharmaceuticals and petroleum additives. In recent years the synthetic resin industry has been responsible for an ever increasing demand for phenolic compounds to be used in phenolic resins. At the present time the largest source of phenolic compounds is coal tar from which over 100 million pounds per year of aromatic hydroxy compounds are obtained. Other potential sources of phenolic compounds are as follows: the tar produced from by-product coke ovens which contains about 2 to 4 per cent tar acids is a potential source of over 100 million pounds per year of phenolic-type compounds; the tar produced in city gas plants is another potential source of 7 million pounds per year of phenolic compounds; shale oil also has a considerable content of phenolic compounds; oils produced by coal hydrogenation and low temperature carbonization are additional potential sources of phenolic compounds.

At the present time isolation of phenolic compounds from coal tar and from other sources is effected by extraction with solvents; solutions of caustic soda, of sodium carbonate and of sodium sulfide, aqueous alcohol, formic acid solution, pyridine sulfate solution are examples of solvents employed in recovery of phenolic compounds. All of these extraction processes involve the use of elaborate equipment and most of them are accompanied by a substantial consumption of chemicals. In general, these extraction processes are very unsatisfactory for separating phenol from oils of low phenolic content. In addition, solvent extraction processes do not effect good separation of phenols from aromatic oils. Most of the extraction processes have the inherent difficulty that they leave a small amount of aromatic oil in the tar acid concentrate. The process of this invention provides an effective means for isolating phenol and alkyl phenols from crude mixtures of both high and low phenolic content. The fact that the phenol and alkyl phenols such as the cresols and xylenols recovered by the complexing technique of this invention may be immediately used in resin manufacture makes this invention of paramount importance in commercial production of phenols.

The process of this invention provides a complete liquid-liquid system for isolation of phenolic compounds from tar oil mixtures with a complexing agent. Polyamino compounds are liquids which may be employed per se or in aqueous solution to contact the crude mixture. The presence of the anti-solvent results in the formation of a liquid complex phase which is readily separated from the anti-solvent solution of crude mixture since a sharp interface exists between the two phases. The liquid-liquid separation process of the subject application is effective for isolation of phenols because good molecular contact is effected between the complexing agent and the crude mixture and because the complex phase is substantially insoluble in the anti-solvent solution of crude mixture.

The presence of an anti-solvent is necessary in order to cause separation of a liquid complex phase. Apparently the polyamine-phenolic compound complexes are soluble in the crude mixture and the presence of an anti-solvent such as a paraffinic hydrocarbon is required in order to effect separation of the polyamine-phenolic compound complex as a separate liquid phase. Although it is possible to add the anti-solvent to a precontacted mixture of complexing agent and crude mixture, the preferred modification involves dilution of the aromatic mixture prior to contact with the liquid polyamino compound or aqueous solution thereof.

The anti-solvent whose presence causes separation of the liquid complex phase is a paraffinic hydrocarbon which is advantageously an aliphatic hydrocarbon containing 3 to 10 carbon atoms. When normally gaseous aliphatic hydrocarbons such as propane and butane are employed as anti-solvents, it is necessary to employ a pressure system. Pentanes and hexanes are particularly preferred anti-solvents since they are easily recovered from the aromatic mixture. Naphthenes such as cyclohexane and cyclopentane are also effective anti-solvents. Mixtures of paraffinic hydrocarbons such as straight run naphtha and petrol ether may also be employed as the anti-solvent.

Ordinarily an equal volume of anti-solvent is added to the aromatic mixture. However, the volume ratio of anti-solvent to crude aromatic mixture may vary between 0.5 and 5 depending upon the concentration of phenolic compounds initially present in the aromatic mixture. In general, if the crude aromatic mixture contains a high percentage of phenolic compound, volume ratios of anti-solvent to crude aromatic mixture in the lower portion of the range of 0.5 to 5 are employed; higher volume ratios are employed when the phenolic content of the tar acid oil is relatively low. For most purposes equal volumes of anti-solvent and aromatic mixture give excellent results.

The complexing agent employed in the process of this invention is an aliphatic polyamino compound or a mixture of aliphatic polyamino compounds. Aliphatic polyamino compounds include alkylene diamines and polyalkylene diamines. Alkylene diamines have the general formula

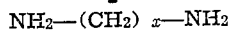

$$NH_2-(CH_2)_x-NH_2$$

where $x$ is at least 1. Ethylene diamine and hexylene diamine are examples of alkylene diamines which may be employed in the process of this invention. Advantageously the alkylene diamine contains less than 8 carbon atoms because alkylene diamine-phenolic compound complexes, wherein the alkylene diamine contains more than 8 carbon atoms, are too soluble in anti-solvent solution of aromatic mixture. Polyalkylene polyamines have the general formula

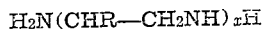

$$H_2N(CHR-CH_2NH)_xH$$

wherein R is an H atom or an aliphatic group and $x$ is at least two. Diethylene triamine, tetraethylene pentamine and octaethylene nonamine are examples of polyalkylene polyamines that may be used in the process of this invention. Apparently there is no limit on the chain length of the polyalkylene polyamines that may be used in the process of this invention with the exception that they either be liquids or possess substantial solubility in water. It is recommended, however, that polyalkylene polyamines be liquids of relatively short chain length, that is, containing no more than 6 recurring units. Ethylene diamine and tetraethylene pentamine are preferred complexing agents.

As indicated previously, removal of low molecular compounds from an aromatic mixture may be effected either with a polyamino compound per se or with an aqueous solution of the polyamino compound. Use of the polyamine compound in substantially anhydrous state is preferred because the complex reaction is faster therewith and emulsion troubles are thereby avoided. However, when using a high molecular weight viscous polyamine compound as complexing agent, it is advisable to use an aqueous solution.

When complexing is effected with a liquid polyamino compound alone, there results a two-phase liquid system from contact of polyamine compound with anti-solvent solution of aromatic mixture. The upper phase comprises anti-solvent solution of aromatic mixture whose content of phenols has been substantially reduced and the lower phase comprises liquid complex phase and complexing agent. The lower phase is readily separated from the anti-solvent solution. Contact of this composite phase with a water-insoluble decomposition solvent such as benzene or ether results in decomposition of the complex into its components. The addition of water assures the formation of a two-phase system comprising an extract phase containing phenols and a polyamine-containing raffinate. After separation of the phases, residual polyamine can be removed from the extract phase by water washing; this water wash can be evaporated to yield recycle polyamine. After stripping of the solvent there is obtained a mixture of phenols of high quality.

The use of an aqueous solution of polyamine for complex formation results in the formation of a three-phase system; the upper phase comprises anti-solvent solution of aromatic mixture whose content of low molecular weight phenols has been substantially reduced; the intermediate stage comprises liquid complex phase; the bottom phase comprises aqueous solution of polyamino compounds. The bottom phase is withdrawn and recycled to contact further quantities of aromatic mixture; make-up polyamine is added to the recycled aqueous phase. The intermediate complex phase is decomposed with a decomposition solvent by the same procedure which has just been described for decomposition of the complex phase obtained when using substantially anhydrous polyamine as complexing agent.

It is recommended that the aqueous solution contain at least 40 weight per cent polyamino compound. If the polyamino compound and the aqueous solution are not completely miscible, a saturated or near-saturated solution of polyamino compound should be employed for complex formation. Although complex formation can be effected with aqueous solutions containing less polyamino compound than these prescribed amounts, the efficiency of the operation is substantially lowered because the extra dissolving power of the aqueous solution causes complex decomposition.

Decomposition of the complex phase is effected with water or preferentially with water-insoluble solvents. Water-insoluble decomposition solvents are low molecular weight aromatic hydrocarbons, such as benzene or toluene, and oxygenated hydrocarbons, such as aliphatic and cyclic ethers. The water-insoluble decomposition solvents possess a high solvent power for the tar acids and a low solvent power for the polyamine complexing agent. The use of water-insoluble decomposition solvents results in the formation of a two-phase system; the extract phase contains phenolic compounds, and the raffinate phase comprises the polyamine complexing agent. Residual complexing agent is removed from the extract phase by water washing. Diethyl ether and tetrahydrofurane are particularly preferred solvents of this type; benzene is also a recommended solvent.

The use of water as a decomposition solvent is only recommended where the complex contains substantially water-insoluble phenols. When the phenolic compounds present in the complex are substantially insoluble in water, decomposition with water results in the formation of a two-phase system; the aqueous extract phase contains the polyamine compounds and the raffinate phase comprises phenolic compounds.

Contact of the anti-solvent solution of phenols containing aromatic mixture with polyamino compound or with aqueous solution thereof is ordinarily effected at atmospheric conditions. However, higher temperatures up to 250° F. can be employed without seriously effecting the contacting operation. It is recommended that complex formation and separation be effected at temperatures between 50 and 150° F.

Formation of the complexes and separation of the liquid complex phase from the aromatic mixture are apparently not affected by pressure. Atmospheric pressure is ordinarily employed but it is feasible to use both subatmospheric and superatmospheric pressures. Superatmospheric pressures are usually employed when the anti-solvent is a normally gaseous hydrocarbon such as propane or butane.

A number of different procedures may be employed to contact the anti-solvent solution of aromatic oil and the polyamine complexing agent. A preferred procedure involves countercurrent contact of anti-solvent solution and polyamine complexing agent in a tower. This system is equivalent to a countercurrent extraction system and results in excellent recovery of phenolic compounds from the aromatic oil on unitary contact. Batch-wise operation in mixing vessels equipped with agitators may also be employed, but does not possess the efficiency of countercurrent tower contacting. A contact time adequate to assure substantially complete complex formation is desired; 10 to 20 minutes of contact time have been found adequate for complex formation and separation of liquid complex phase from anti-solvent solution of aromatic oil.

Decomposition of the complex is usually effected at temperatures of 50 to 150° F. although higher temperatures up to 250° F. may be employed without harmful results. Atmospheric temperature is usually employed.

Atmospheric pressure is usually employed for complex decomposition, but subatmospheric and superatmospheric pressures may also be employed.

In the accompanying drawing there is diagrammatically outlined one modification of the process of this invention. The modification shown in the drawing involves contact of anti-solvent solution of tar acid oil with substantially anhydrous ethylene diamine and decomposition of the separated complex phase with diethyl ether.

Tar acid oil obtained from coil tar distillation and containing approximately 50 weight per cent tar acids is introduced into the contact tower 3 through pipe 1. An equal volume of pentane anti-solvent is introduced into the lower portion of tower 3 through a pipe 2 to form an anti-solvent solution of tar oil. The resulting mixture is contacted countercurrently with an equal volume of ethylene diamine which is introduced into the upper portion of the tower 3 through a pipe 5.

Countercurrent contact of anti-solvent solution of tar acid oil and ethylene diamine results in the formation of a complex comprising ethylene diamine and phenols containing up to 15 side chain carbon atoms. The complex is substantially insoluble in the anti-solvent solution of tar oil and is withdrawn from the lower portion of the tower 3 through a pipe 6; excess complexing agent is withdrawn from the tower 3 together with complex. The complex phase is pentane washed in the bottom portion of the tower 3 prior to its withdrawal therefrom.

There is withdrawn from the upper portion of the tower 3 through a pipe 7 an anti-solvent solution of aromatic oil which is substantially free of tar acids. The pentane solution of aromatic oil is introduced into a wash tower 8 wherein it is subjected to countercurrent washing with water which is introduced therein through a pipe 9. Water washing removes residual ethylene diamine and complex from the pentane solution of tar oil prior to heat stripping the pentane therefrom for recycle to the contact tower 3. The water wash containing ethylene diamine is removed from the wash tower 8 through a pipe 10 and is sent to a dehydrator for recovery of substantially anhydrous ethylene diamine therefrom; the dehydrator will be described hereafter.

The water-washed pentane solution of aromatic oil is removed from the wash tower 8 through a pipe 14 and is introduced into a stripping tower 15 for removal of pentane. Pentane is taken off overhead through a pipe 16 and is recycled therethrough to a pipe 2 and thence into the tower 3.

There is withdrawn from the bottom portion of the stripping tower 15 through a pipe 18 aromatic oil which is substantially free of low molecular weight phenol compounds and whose total tar acid content is approximately 4 per cent. If further removal of phenolic compounds from this tar acid oil is desired, it can be recycled to the contact tower 3.

A complex phase comprising complex and excess ethylene diamine is withdrawn from the contact tower 3 through a pipe 6 and is introduced into a tower 31. Ether is also introduced into the bottom portion of the tower 31 through a pipe 21. Contact of ether and complex phase in the tower 31 results in the decomposition of the complex and formation of an ether solution of phenolic compounds. Water is introduced into the upper portion of the tower 31 through a pipe 32 and washes residual ethylene diamine from the ether solution of extracted phenolic compounds rising therethrough.

There is removed from the bottom of the tower 31 through a pipe 34 an aqueous solution of ethylene diamine which passes therethrough to a dehydrator 35. The water wash obtained on washing anti-solvent solution of aromatic oil in wash tower 8 is also introduced into the dehydrator 35 and water is removed from these wash solutions to yield substantially anhydrous ethylene diamine. Advantageously this dehydrator is operated at reduced pressure, and water is taken off overhead through a pipe 36. Ethylene diamine containing some low molecular weight phenols is withdrawn from the bottom of the dehydrator 35 through a pipe 38 and is recycled to the contact tower 3 through pipe 38.

The water-washed ether solution of phenolics is removed from the wash tower 31 through a pipe 40 and is introduced into stripper 41 for removal of ether. Stripped ether is taken off overhead through a pipe 42 and is recycled therethrough to pipe 21 and thence into the tower 31.

There is removed from the bottom portion of stripping tower 41 through a pipe 45 phenol and alkyl phenols of better than 99 per cent purity. This mixture of phenolic compounds can be resolved into individual phenolic compounds by fractional distillation.

The modification involving use of an aqueous solution of polyamine complexing agent is effected by a similar procedure to that which has been described for the use of substantially anhydrous polyamine as the complexing agent. The only distinctions are that a three-phase system results from contact of an aqueous solution of complexing agent with antisolvent solution of tar acid oil; the upper phase comprises antisolvent solution of aromatic oil which is substantially free of phenolic compounds; the intermediate layer is complex phase which is decomposed in similar fashion to the procedure outlined for the modification involving use of substantially anhydrous polyamine complexing agent; the lower phase comprises aqueous solution of polyamine and is recycled to the contacting zone after the concentration of complexing agent has been restored either by partial dehydration or by the addition of make-up complexing agent. The polyamine recovered from the water washes of the anti-solvent solution of aromatic oil and the water washing of the ethereal solution of phenols can be used as make-up polyamine.

It is also feasible to contact phenol-containing mixture with the polyamine compound and thereafter add anti-solvent to effect separation of the complex phase. For example, a crude tar oil mixture may be contacted with ethylene diamine with the resulting formation of complexes which are soluble in the tar oil mixture; the addition of anti-solvent to the reaction mixture will result in the separation of the liquid complex phase which is treated as previously described for recovery of phenol and alkyl phenols therefrom. This modification is ordinarily not employed since poorer contact and less efficient phenol separation are effected therewith.

The following examples illustrate the separation of phenol and alkyl phenols from a crude aromatic mixture by the process of this invention. Example I illustrates the use of an alkyl diamine for recovery of phenolic compounds from a crude aromatic mixture and the use of ether as a decomposition solvent. Example II illustrates the use of a polyalkylene diamine for recovery of phenolic compounds from aromatic mixture and the use of benzene as a decomposition solvent. Example III illustrates the use of an aqueous solution of an alkylene diamine for separation of phenolic compounds.

*Example I*

100 cc. of a tar oil produced by low temperature carbonization of coal and containing 49.6 weight percent tar acids was mixed with 100 cc. of ethylene diamine at room temperature and 350 cc. of pentane. There was formed a two-phase system comprising a complex phase and a pentane-tar oil phase. Complex phase was withdrawn and washed with an additional 300 cc. of pentane. The pentane wash was combined with the pentane-tar oil phase and the composite thereby formed was subjected to water washing. The water-washed composite was then stripped of pentane to yield a neutral tar oil containing approximately 4 weight percent tar acids.

The pentane-washed complex phase was treated with 200 cc. of ether which resulted in the formation of an ether solution of phenolic compounds. The ether solution was washed three times with 200 cc. portions of water to remove ethylene diamine therefrom. Water-washed ethereal solution was then freed of ether to yield a tar acid concentrate which analyzed better than 99 weight percent tar acids.

*Example II*

200 cc. of a high boiling tar acid oil containing 74.5 weight percent tar acids was contacted with 100 cc. of tetraethylene pentamine at a residence time of about 10 minutes. The resulting solution was diluted with 400 cc. of pentane whereby there was formed a two-phase liquid system comprising a pentane solution of tar oil and a lower complex phase. The pentane-tar oil phase was withdrawn, washed with water to remove complex and complexing agent therefrom. The washed oil phase was stripped free of pentane to yield 47 g. of an oil which analyzed approximately 4.9 weight percent tar acids.

The complex phase was treated with 700 cc. of benzene whereby there was formed a two-phase liquid system. The upper phase consisting of a benzene solution of tar acids was water washed and then stripped free of benzene to yield 74 g. of a tar acid concentrate which analyzed better than 96 weight percent tar acids. The lower liquid phase obtained on benzene treating of the complex phase was dissolved in ether. The ether solution was water washed and then stripped free of ether to yield 16 g. of a tar acid concentrate which analyzed 100 weight percent tar acids.

*Example III*

100 cc. of a tar acid oil containing 49.6 weight percent tar acids was diluted with 200 cc. of pentane and then contacted with 100 cc. of an aqueous solution containing 50 percent tetraethylene pentamine. A three-phase system resulted from this contact; the upper layer comprised a pentane solution of tar oil; the intermediate layer comprised a complex-rich phase, and the lower layer comprised a water-rich phase. The complex-rich and water-rich phases were withdrawn and a composite thereof was washed with 300 cc. of pentane. The washed composite was contacted with ether with the resulting formation of a two-phase system. The lower layer comprised an aqueous solution of tetraethylene pentamine which was recycled to the complexing reaction. The upper ether extract phase was water washed and then stripped free of ether to yield 22 cc. of a tar acid concentrate containing 100 percent tar acids.

The pentane solution of tar oil together with the pentane wash of the combined complex-rich and water-rich phases was water washed and then stripped free of pentane to yield 50 cc. of an oil containing about 9 weight percent tar acids.

The process of the invention may also be employed to purify mixtures of phenol and alkyl phenols containing up to 15 side chain carbon atoms when their presence is deleterious in the intended use of the mixture. In this utilization of the invention it is not necessary to recover the phenolic compounds from the complex phase which separated in the presence of the anti-solvent.

Obviously, many modifications and variations of the invention as hereinbefore set forth may be made without departing from the spirit and scope thereof and, therefore, only such limitations should be imposed as are indicated in the appended claims.

We claim:

1. A process for isolating phenolic compounds containing up to 15 side chain carbon atoms from phenolic compound-containing mixtures which comprises contacting said mixture with a water-soluble aliphatic polyamino compound selected from the group consisting of alkylene diamines, polyalkylene diamines and mixtures thereof, whereby there are formed complexes of said polyamino compounds and said phenolic compounds, separating a liquid complex phase from said mixture in the presence of an anti-solvent selected from the group consisting of paraffinic and naphthenic hydrocarbons and mixtures thereof, decomposing said separated complex phase by contact with a solvent, and recovering said phenolic compounds from said decomposed mixture.

2. A process for isolating phenolic compounds containing up to 15 side chain carbon atoms from phenolic compound-containing mixtures which comprises contacting said mixture with a water-soluble aliphatic polyamino compound selected from the group consisting of alkylene diamines, polyalkylene polyamines and mixtures thereof, whereby there are formed complexes of said polyamino compound and said phenolic compounds, separating a liquid complex phase from said mixture in the presence of an anti-solvent selected from the group consisting of paraffinic and naphthenic hydrocarbons and mixtures thereof, decomposing said separated complex phase by contact with a water-immiscible solvent selected from the group consisting of low molecular weight aromatic compounds and oxygenated hydrocarbons to form an extract solution of said phenolic compounds, and recovering said phenolic compounds from said extract solution.

3. A process according to claim 2 in which the anti-solvent is a paraffinic hydrocarbon.

4. A process according to claim 2 in which decomposition of the complex is effected with an aliphatic ether.

5. A process according to claim 2 in which contact of the aliphatic polyamino compound with the crude mixture is effected at a temperature below 250° F. and decomposition of the separated liquid complex phase is effected at a temperature below 250° F.

6. A process according to claim 2 in which decomposition of the complex is effected with benzene.

7. A process for isolating phenolic compounds containing up to 15 side chain carbon atoms from phenolic compound-containing mixtures which comprises diluting said mixture with an anti-solvent selected from the group consisting of paraffinic and naphthenic hydrocarbons and mixtures thereof, contacting said diluted mixture with a water-soluble aliphatic polyamino compound selected from the group consisting of alkylene diamines, polyalkylene polyamines and mixtures thereof, at a temperature below 250° F. whereby there is formed a liquid complex of said polyamino compound and said phenolic compounds, which complex is substantially insoluble in anti-solvent solution of said mixture, separating said liquid complex from said mixture and decomposing said separated complex phase by contact with a water-immiscible solvent selected from the group consisting of low molecular aromatic hydrocarbons, and oxygenated hydrocarbons to form an extract solution of said phenolic compounds at a temperature below 150° F. and recovering said phenolic compounds from said extract solution.

8. A process according to claim 7 in which substantially anhydrous polyamino compound is employed as the complexing agent.

9. A process according to claim 7 in which a concentrated aqueous solution of polyamino compound is employed as the complexing agent.

10. A process according to claim 7 in which the anti-solvent is a paraffinic hydrocarbon.

11. A process according to claim 7 in which decomposition of the complex phase is effected with an aliphatic ether.

12. A process for isolating phenolic compounds containing up to 15 side chain carbon atoms from phenolic compound-containing mixtures, which comprises diluting said mixture with an anti-solvent selected from the group consisting of paraffinic and naphthenic hydrocarbons and mixtures thereof, contacting said diluted mixture with an aliphatic polyamino compound selected from the group consisting of alkylene diamines, polyalkylene polyamines and mixtures thereof at a temperature below 250° F. whereby there is formed a liquid complex of said polyamino compound and said phenolic compounds, which complex is substantially insoluble in anti-solvent solution of said mixture, separating said liquid complex from said mixture and decomposing said separated complex phase by contact with an ether solvent at a temperature below 150° F. to form an ether solution of said phenolic compounds, washing said ether solution with water and recovering said phenolic compounds from said water-washed solution.

13. A process for isolating phenolic compounds containing up to 15 side chain carbon atoms from phenolic compound-containing mixtures, which comprises diluting said mixture with an anti-solvent selected from the group consisting of paraffinic and naphthenic hydrocarbons and mixtures thereof, contacting said diluted mixture with a water-soluble aliphatic polyamino compound selected from the group consisting of alkylene diamines, polyalkylene polyamines and mixtures thereof at a temperature between 50 and 150° F. whereby there is formed a liquid complex of said polyamino compound and said phenolic compounds, which complex is substantially insoluble in anti-solvent solution of said mixture, separating said liquid complex from said mixture, decomposing said separated complex by contact with an ether solvent at a temperature between 50 and 150° F. to form a solution of phenolic compounds, water washing said ether solution of phenolic compounds, and recovering said phenolic compounds from said solution.

14. A process according to claim 13 in which the anti-solvent is a paraffinic hydrocarbon.

15. A process according to claim 13 in which ether is employed as the decomposition solvent.

16. A process according to claim 13 in which tetrahydrofurane is employed as the decomposition solvent.

17. A process according to claim 13 in which an aqueous solution containing at least 40 weight per cent polyamine compound is employed as the complexing agent.

18. A process for separating phenolic compounds containing up to 15 side chain carbon atoms from phenolic compound-containing mixtures, which comprises contacting said mixture with a water-soluble ailphatic polyamino compound selected from the group consisting of alkylene diamines, polyalkylene polyamines and mixtures thereof, whereby there are formed complexes of said polyamino compounds and said phenolic compounds, and separating a liquid complex phase from said mixture in the presence of an anti-solvent selected from the group consisting of paraffinic and naphthenic hydrocarbons and mixtures thereof to yield a mixture whose content of phenol and alkyl phenols is substantially reduced.

HOWARD V. HESS.
GEORGE B. ARNOLD.

REFERENCES CITED

The following references are of record in the file of this patent:

UNITED STATES PATENTS

| Number | Name | Date |
|---|---|---|
| 1,955,023 | Roos et al. | Apr. 17, 1934 |
| 2,184,928 | Luten, Jr., et al. | Dec. 26, 1939 |
| 2,256,753 | Scheurmann et al. | Sept. 23, 1941 |